US005305516A

United States Patent [19]
Imazeki et al.

[11] Patent Number: 5,305,516
[45] Date of Patent: Apr. 26, 1994

[54] METHOD OF MANUFACTURING FLYING MAGNETIC HEADS

[75] Inventors: Nobuo Imazeki; Kazuhiro Saito, both of Saitama, Japan

[73] Assignee: Nikko Kyodo Company, Limited, Tokyo, Japan

[21] Appl. No.: 987,940

[22] Filed: Dec. 9, 1992

[30] Foreign Application Priority Data

Dec. 9, 1991 [JP] Japan .................................. 3-350320

[51] Int. Cl.⁵ .................................................. G11B 5/42
[52] U.S. Cl. ...................................... 29/603; 360/123; 360/126
[58] Field of Search ........... 29/603; 360/123, 125–127

[56] References Cited

U.S. PATENT DOCUMENTS 4,897,915  2/1990  Ito .......................................... 29/603
4,947,542  8/1990  Satomi et al. ......................... 29/603

FOREIGN PATENT DOCUMENTS 87606  6/1988  Japan .
32714  5/1991  Japan .

*Primary Examiner*—Carl E. Hall
*Attorney, Agent, or Firm*—Panitch Schwarze Jacobs & Nadel

[57] ABSTRACT

A method of manufacturing a flying magnetic head of composite type using a magnetic thin film layer as a head core. The flying magnetic head comprises a slider, an I core bar bonded via a high-melting-point bonding glass layer to one end face of the slider and a C core bonded via a high-melting-point bonding glass layer serving as a gap spacer to the I core bar. The I core bar and C core have respective magnetic thin film layers, which are aligned to each other and mated with an ABS of the slider. I core bar is formed at a position corresponding to a wiring groove of the C core with a window groove. Such flying magnetic heads having a smooth ABS can be readily and massively manufactured.

16 Claims, 7 Drawing Sheets

FIG. 1
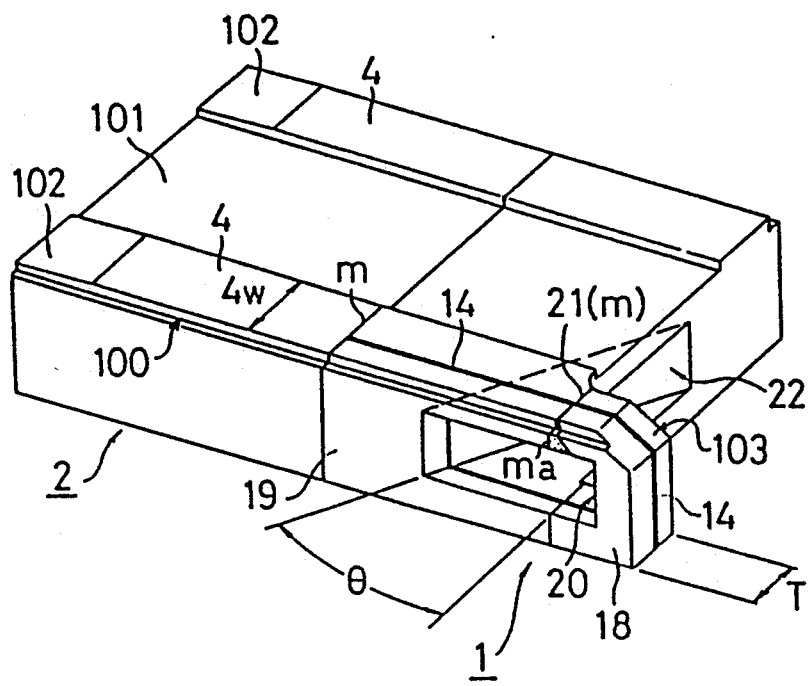
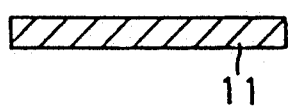
FIG. 2A
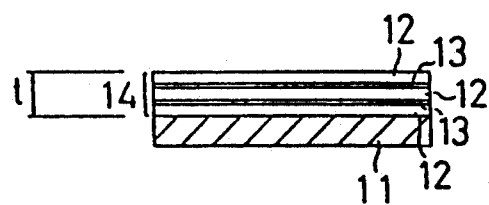
FIG. 2C
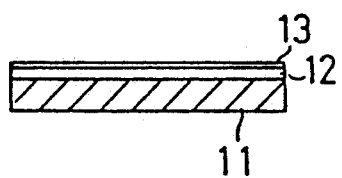
FIG. 2B
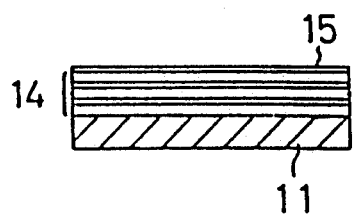
FIG. 2D FIG. 4a
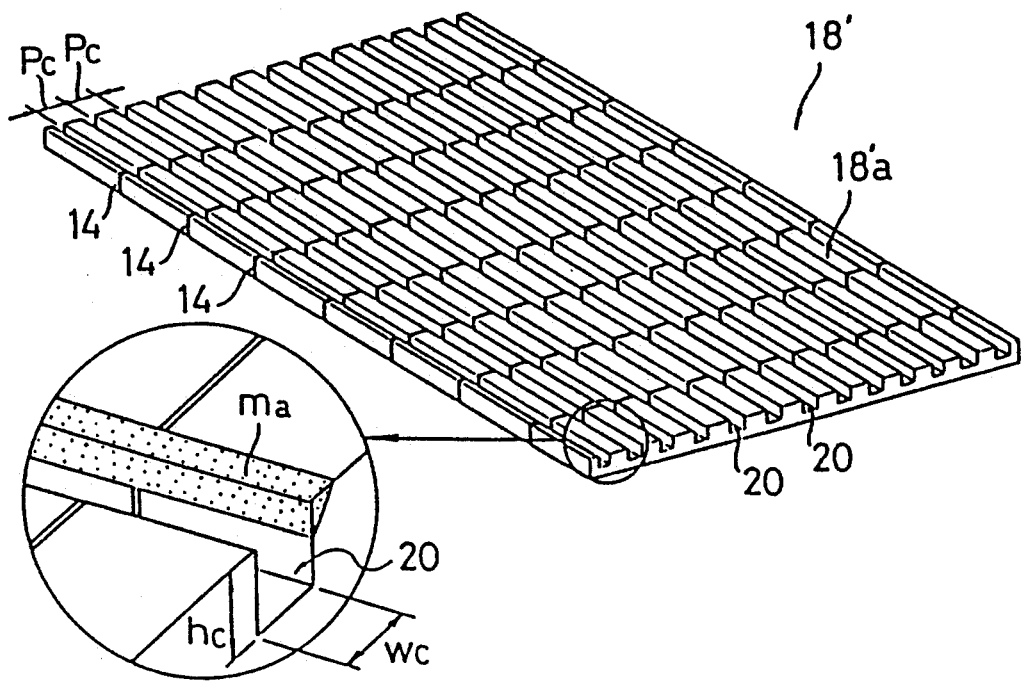
FIG. 4b
FIG. 5a
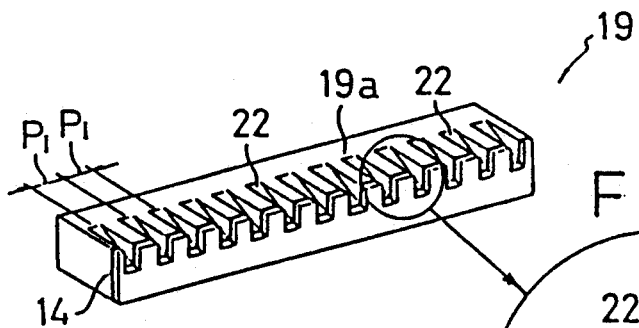
FIG. 5b
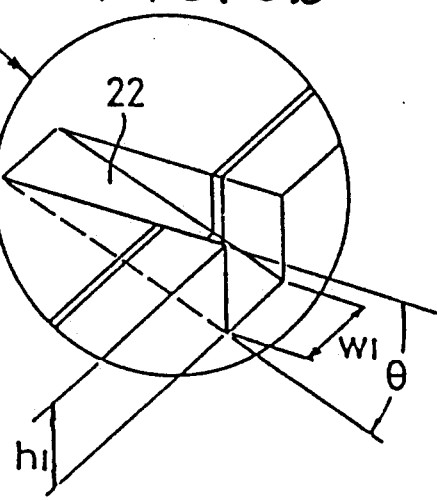

METHOD OF MANUFACTURING FLYING MAGNETIC HEADS

BACKGROUND OF THE INVENTION

Field of the Invention

This invention relates to techniques for flying magnetic heads used with magnetic disk drives and, more particularly, to a method of manufacturing flying magnetic heads of a composite type using a thin-film-laminated core as a head core (or a head chip).

Recently, composite type flying magnetic heads, which use as a head core a thin-film-laminated core obtained by laminating on a substrate a magnetic thin film comprising an Fe-Si-Al alloy (Sendust), an amorphous magnetic material, an iron nitride type alloy, etc., have attracting attention because they can be used for magnetic disk drives and the like, permit high density recording and permit track width reduction.

FIG. 13 shows a flying magnetic head commonly called a composite type, which has been proposed earlier by the present applicant as Japanese Patent Application No. 84441/1991. This flying magnetic head comprises a head 1 and a slider 2 and, although not shown, is connected to an actuator of an associated apparatus via a leaf spring support mechanism.

This flying magnetic head uses a bonding glass m having a high melting point in lieu of a low-melting molding glass which has hitherto been used for bonding the head core 1 to the slider 2. Thus, it can greatly reduce the exposed area of the glass layer m on an air-bearing-surface (hereinafter referred to simply as "ABS") 4 and extremely improve the CSS (contact start characteristic, thus extremely improving the reliability as a whole.

However, even the composite type flying magnetic heads using such a thin-film-laminated core are required to provide improved performance. Particularly, it is desired to increase the number of turns of a winding 200 provided in the head core 1 from 40 turns at present to 40 turns, for instance.

To this end, it is necessary to expand a wiring groove 20 formed in a C core 18.

To meet this aim, the inventors produced a head core 1 with expanded wiring groove 20 by forming a transversal window groove 19A in an I bar 19, as shown by phantom lines. In this case, however, the corresponding end portion of the head core 1, bonded to the slider 2, popped during the processing of the ABSs such as a processing to form edge grooves 100 and a top center groove 101 and also a processing to form inclined surfaces 102 and 103. It was thus impossible to obtain smooth ABSs. This seems to be due to a reduction of the mechanical strength of the head 1 itself and hencereduction of the resistance of the ABS surfaces againstgrinding, caused by the formation of the transversal window groove 19A in the I bar 19.

In order to provide a composite type flying magnetic head, which permits increase of the turns number of the head core winding to enhance performance without reducing the mechanical strength of the head core, facilitates the processing of the ABS, permits a smooth ABS to be obtained and uses a thin-film-laminated core as the head core, the inventors produced a flying magnetic head of composite type, as shown in FIG. 1, which comprises a slider having an ABS, an I core bar having a magnetic thin film layer, one end face of the I core bar being bonded to the entire area of one end face of the slider such that the magnetic thin film layer of the I core is mated with the ABS, and a C core having a magnetic thin film layer, the C core being bonded to the other end face of the I core bar such that the magnetic thin film lamyer of the C core bar is mated with the magnetic thin film layer of the I core bar, the I core bar being formed at a position thereof corresponding to a wiring groove with an inclined window groove having a predetermined inclination angle $\theta$.

SUMMARY OF THE INVENTION

The present invention relates to a method of manufacturing such flying magnetic head.

According to the invention, the above flying magnetic head is manufactured by a method, which comprises:

(a) forming a magnetic thin film layer on each of a plurality of substrates;

(b) bonding together said plurality of substrates each provided with said magnetic thin film layer with intervening high-melting-point laminate glass layers to form a magnetic thin film lamination;

(c) slicing said magnetic thin film lamination in the direction of the thickness of said lamination to obtain a plurality of core plates;

(d) grooving one of the principal surfaces of some of said core plates in a direction perpendicular to said magnetic thin film layer to form wiring grooves and apex glass molding grooves, thus obtaining C core plates formed with said wiring grooves and said apex glass molding grooves at predetermined positions;

(e) slicing other ones of said core plates in a direction parallel to said magnetic thin film layers to obtain I core bars;

(f) forming each of said I core bars with a given number of window grooves;

(g) depositing at least a high-melting-point bonding glass layer on the surface of each said C core plate formed with said wiring grooves and on the surface of each said I core bar formed with said window grooves;

(h) overlapping the bonding glass layer formation surfaces of each of a given number of said I core bars and each said C core plate, overlapping a dummy plate with a high-melting-point bonding glass layer formed thereon and the other surface of said I core bars and bonding together said I core bars, said C core plate and said dummy plate with intervening bonding glass layers to form a magnetic head block;

(i) grooving said magnetic head block on the side of said C core plate to form C cores having a predetermined head core thickness;

(j) subsequently, slicing said magnetic head block in a direction parallel to said C cores to obtain a given number of magnetic head bars;

(k) forming each said magnetic head bar with edge grooves and a center groove, thus forming ABSs and then slicing the resultant magnetic head bar to obtain a given number of flying magnetic heads;

(l) obliquely chamfering front and rear portions of said ABSs of each said separated flying magnetic head to form inclined surfaces; and (m) providing a winding on the C core of each said flying magnetic head.

The softening point of the high-melting-point laminate glass is set to 650° to 800° C. The softening point of the high-melting-point bonding glass is set to 550° to 650° C. The substrate and dummy plate are formed of a non-magnetic material or ferrite. The magnetic thin film layer is formed of an Fe-Si-Al alloy, an amorphous magnetic material or an iron nitride type alloy.

BRIEF DESCRIPTION OF THE DRAWINGS

FIG. 1 is a perspective view showing a flying magnetic head of composite type;

FIGS. 2A-2D are views showing steps of a method of obtaining a substrate with a magnetic thin film layer formed thereon;

FIGS. 4A and 4B are perspective view showing a C core plate;

FIGS. 5A and 5B are perspective view showing an I core bar;

DETAILED DESCRIPTION OF THE PREFERRED EMBODIMENT

Now, the method of manufacturing flying magnetic heads according to the invention will be described in detail in conjunction with an embodiment thereof with reference to the drawings.

FIG. 1 shows a flying magnetic head of a composite type. In this flying magnetic head, a head core (or head chip) 1 and a slider 2 are bonded together, and this slider 2 with the head core is connected to an actuator of a magnetic disk drive via a leaf spring mechanism (not shown).

Figure 13:
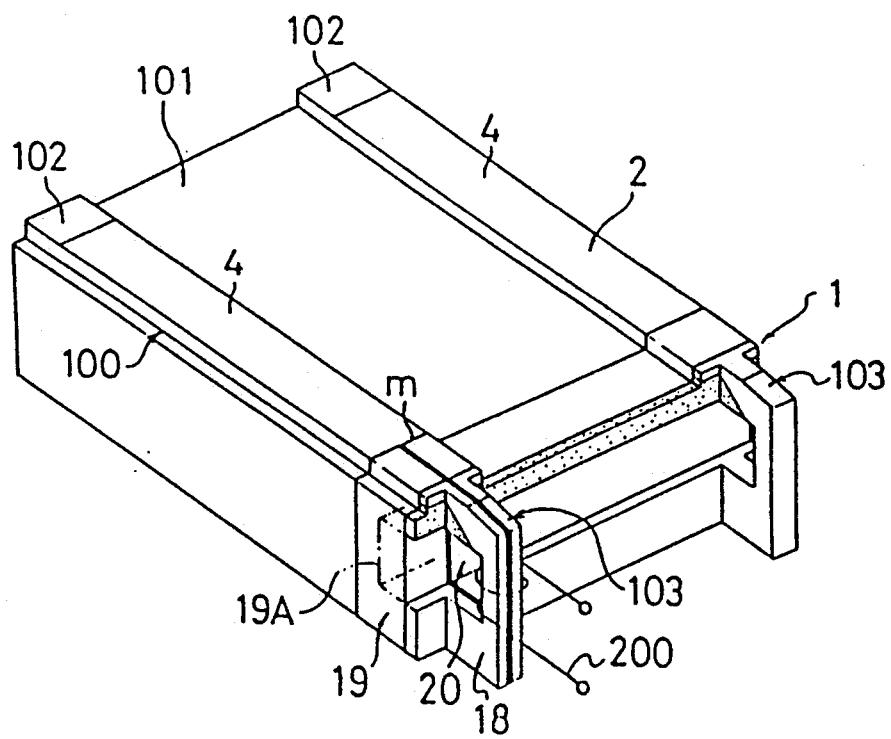
FIG. 13 is a perspective view showing a prior art flying magnetic head of magnetic thin-film-laminated composite type.

More specifically, this flying magnetic head, like the flying magnetic head disclosed in Japanese Patent Application No. 84441/1991 filed by the present applicant and described before in connection with FIG. 13, comprises, in addition to the slider 2, an I core bar 19 bonded by a high-melting-point bonding glass layer m to the entire area of one end face of the slider 2 and a C core 18 bonded via a gap spacer 21 such as the high-melting-point bonding glass layer m to the I core bar 19. The I core bar 19 and C core 18 have respective magnetic thin films 14, which are aligned to each other and mated with the ABS 4 of the slider 2.

Further, the I core bar 19 has an inclined window groove 22 formed in a position corresponding to wiring groove 20. The inclination angle $\theta$ of the inclined window groove 22 may be selected as desired. Together with the wiring groove 20 of the C core 18, the inclined window groove 22 can provide a winding space.

Now, the method of manufacturing the flying magnetic head according to the invention will be described.

First, a method of manufacturing a thin-film-laminated head core used as the head core 1 by laminating magnetic thin films on a substrate will be described. For the magnetic thin film, Fe-Si-Al alloy magnetic materials, amorphous magnetic materials, iron nitride type alloys and so forth may be used. According to the preferred embodiment of this invention, an Fe-Si-Al alloy magnetic material is used.

In this method, a non-magnetic substrate 11 of a ceramic or the like is prepared (FIG. 2(A)). On the substrate 11 an Fe-Si-Al alloy film 12 is deposited to a thickness of 1 to 20 $\mu$m by a spattering process. Then, on the Fe-Si-Al alloy film 12 a non-magnetic insulating film 13 is deposited to a thickness of 0.03 to 0.5 $\mu$m by a spaterring process (FIG. 2(B)). The non-magnetic film 13 may be formed of $SiO_2$, $Al_2O_3$, etc.

The above sequence of operations is repeated to laminate necessary numbers of the Fi-Si-Al alloy and non-magnetic insulating films 12 and 13, thus forming a magnetic alloy thin film layer 14 having a thickness t on the substrate 11 as shown in (FIG. 2(C)).

Then, on the magnetic thin film layer 14 a high-melting-point laminate glass 15 having a softening point of 650° C. or above, preferably 650° to 800° C., is formed to a thickness of 0.05 to 1.0 $\mu$m by a spattering process or the like (FIG. 2(D)). The laminate glass 15 may be formed suitably by using an $SiO_2$-$Al_2O_3$-$Na_2O$ type glass or an $SiO_2$-$B_2O_3$-$Na_2O$ type glass.

Figure 3A:
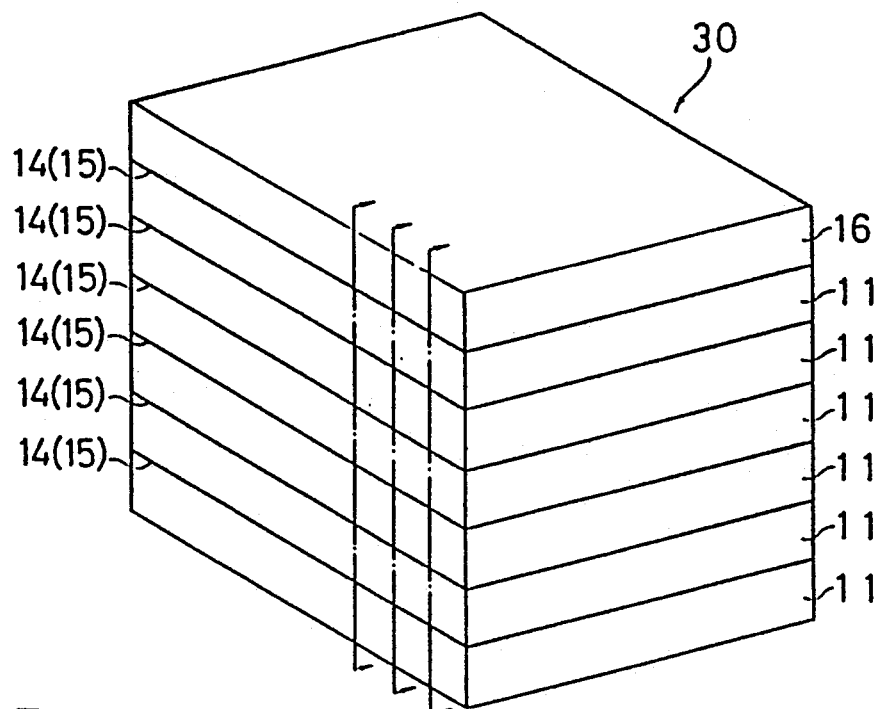
FIGS. 3A-3C are views showing a step of obtaining core plates and I core bars from a magnetic thin film lamination.
Figure 3B:
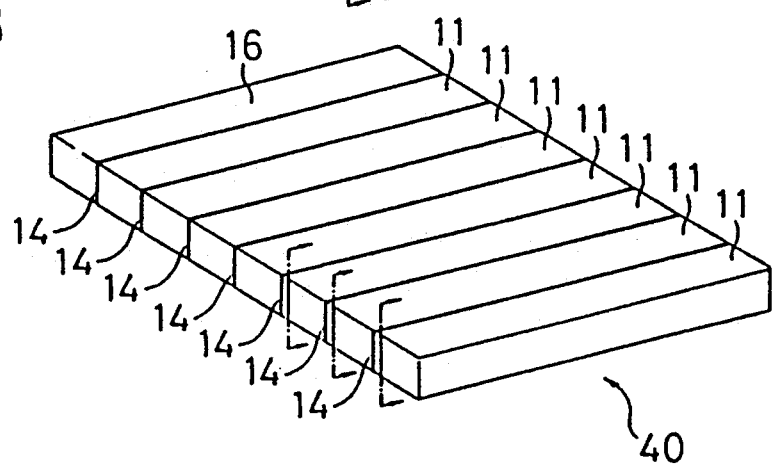

Subsequently, as shown in FIG. 3, a plurality of substrates 11 each with the magnetic thin film layer 14 formed in the above way are stacked together with a top dummy plate 16, and then pressed together in a jig or the like under heating. Thus, the individual stack members are bonded together by the laminate glass layers 15 to obtain a magnetic thin film lamination 30 (FIG. 3(A)). The dummy plate 16 is of the same material as the substrate 11. The lamination 30 is sliced in the thickness direction of lamination as shown by phantom lines in FIG. 3(A) to obtain core plates 40 for manufacturing C cores 18 and I core bars 19 (FIG. 3(B)).

Some of the core plates 40 thus obtained are then each formed on one side and at predetermined positions thereof with wiring grooves 20 and grooves for receiving apex glass moldings ma, these grooves extending perpendicular to the magnetic thin film layer 14, thus obtaining C core plates 18'.

Figure 3C:
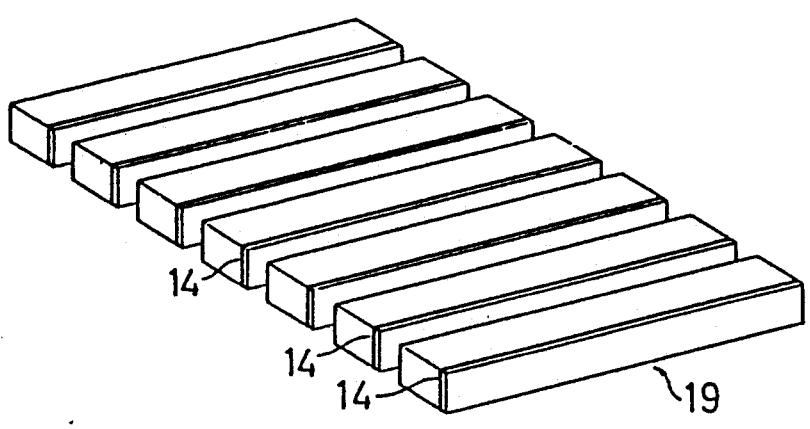

Other core plates 40 are each cut in a direction parallel to the magnetic thin film layer 14 as shown by phantom lines in FIG. 3(B) to obtain eventual I core bars 19 (FIG. 3(C)). Each I core bar 19 is then formed with inclined window grooves 22 having a predetermined inclination angle $\theta$ by incline-grooving or spot facing, as shown in FIG. 5. The pitch $P_c$ of wiring grooves 20 in the C core plate 18' and the pitch $P_I$ of the inclined window grooves 22 in the I core bar 19 are made equal. The width $W_c$ of the wiring groove 20 and the width $W_I$ of the inclined window groove 22 are not limited but usually made equal. The depths $h_c$ and $h_I$ of the grooves 20 and 22 are appropriately selected as desired.

After the formation of the wiring grooves and inclined window grooves, the surface 18'a of the C core plate 18' formed with the wiring grooves 20 and the surface 19a of the I core bar 19 formed with the inclined window grooves 22 are polished. Then, on the polished surfaces 18'a and 19a a non-magnetic gap material, for instance $SiO_2$, is formed by spattering, and then the bonding glass layer m is formed by means of the spattering process. Where no gap material is provided, the bonding glass layer m itself also serves as a gap spacer 21. The bonding glass layer m suitably comprises a high-melting glass with a melting point of 550° C. or above, preferably 550° to 650° C., for instance, an $SiO_2$-$Al_2O_3$-$Na_2O$ type glass or an $SiO_2$-$B_2O_3$-$Na_2O$ type glass.

Figure 6:
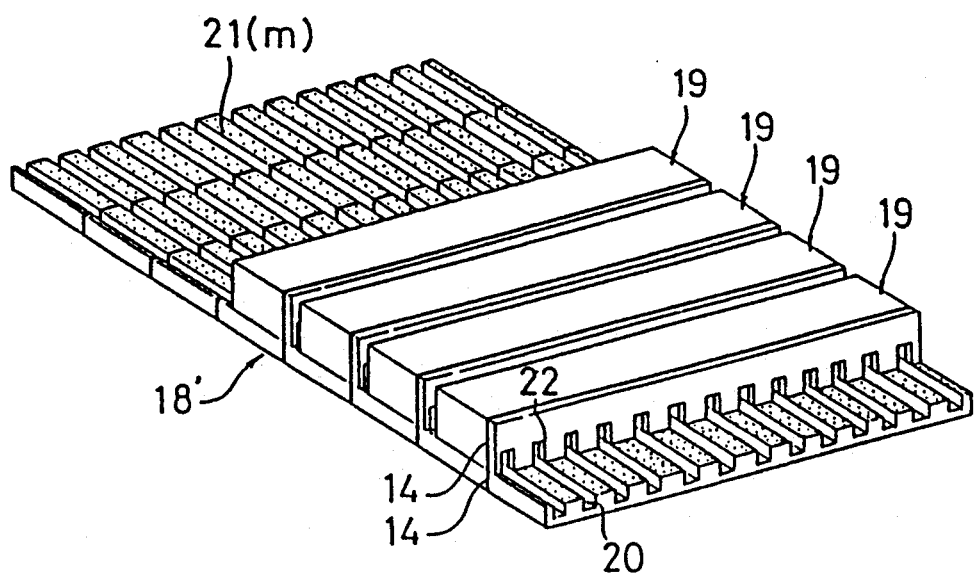
FIG. 6 is a perspective view showing a C core plate and I core bars overlapped thereon.
Figure 7:
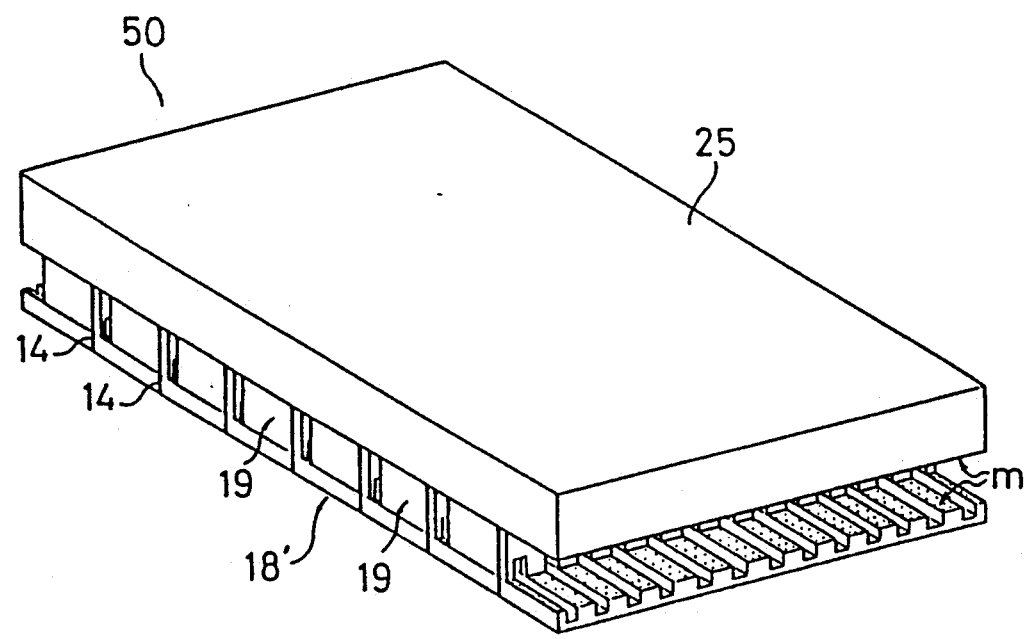
FIG. 7 is a perspective view showing a magnetic head block.

Then, as shown in FIG. 6, each C core plate 18' and a corresponding number of the I core bars 19 are overlapped with their bonding glass layer surfaces 18'a and 19a face to face by aligning the wiring grooves 20 of the C core plate 18' and inclined window grooves 22 of the I core bars 19 and also aligning the magnetic thin film layers 14, i.e., by carrying out track alignment. Then, as shown in FIG. 7, a dummy plate 25 is overlapped over the other surface of the I core bars 19. Of course at this time, the bonding glass layer m is formed by means of spattering on the but surface of the I core bars 19 and/or the dummy plate 25. The thickness of the bonding glass layer m for the bonding of the I core bars 19 and dummy plate 25, may be set to be substantially equal to the gap to be obtained, for instance 0.1 to 0.7 μm. The dummy plate 25 comprises a ceramic or like non-magnetic material and has a rectangular sectional profile. It constitutes eventual slider 2. The bonding glass layer m, as noted above, suitably comprises a high-melting-point glass with a melting point of 550° C. or above, preferably 550° to 650° C., for instance an $SiO_2$-$Al_2O_3$-$Na_2O$ type glass or an $SiO_2$-$B_2O_3$-$Na_2O$ type glass.

The C core plate 18', I core bars 19 and dummy plate 25 thus overlapped over one another, are then bonded to one another via the bonding glass layer m in a jig or the like under heating and pressing, thus obtaining a magnetic head block 50.

Figure 8:
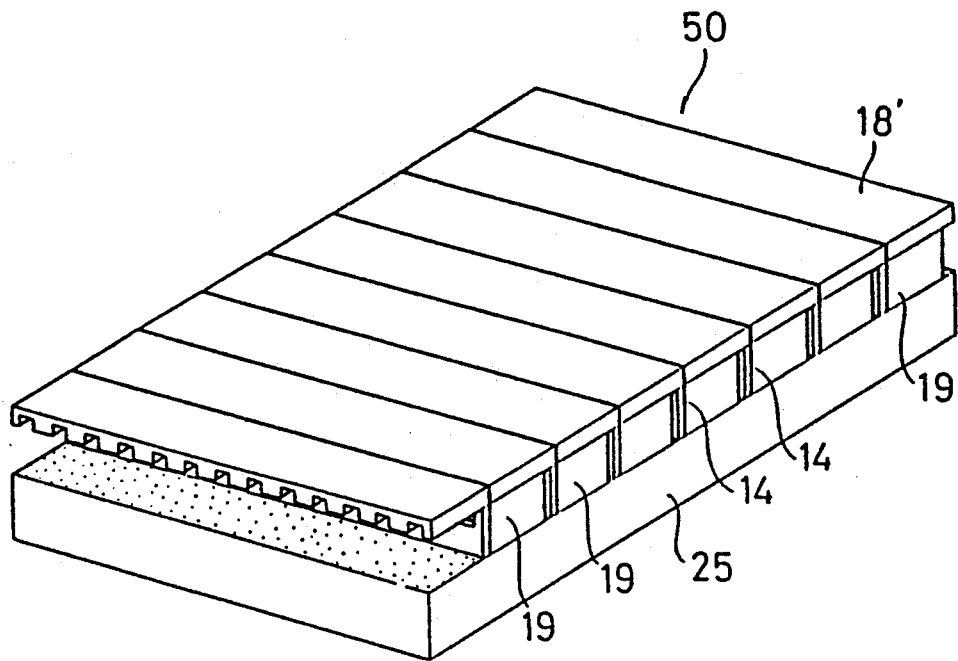
FIG. 8 is a perspective view showing the magnetic head block in an inverted state.

It is to be appreciated that by the manufacturing method according to the invention the bonding of the C core plate 18', I core bars 19 and dummy plate 25, i.e., the formation of the gap 21 in the head core 1 and the bonding of the head core 1 and slider 2, can be attained simultaneously using the high-melting-point bonding glass layer m. FIG. 8 shows the magnetic head block 50 obtained in the above way with the dummy plate 25 down.

Figure 9:
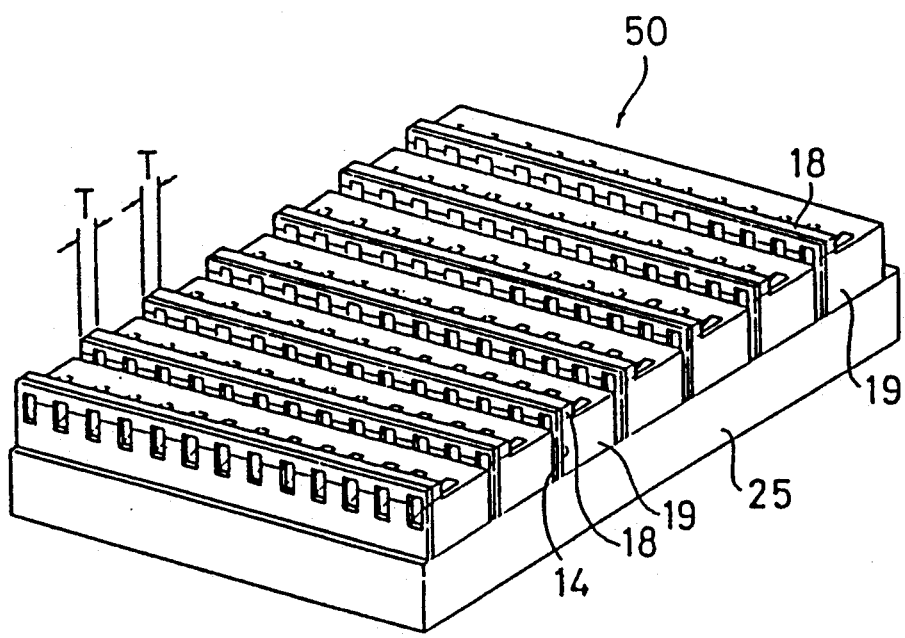
FIG. 9 is a perspective view showing the magnetic head block after formation of grooves on the C core plate side.
Figure 10:
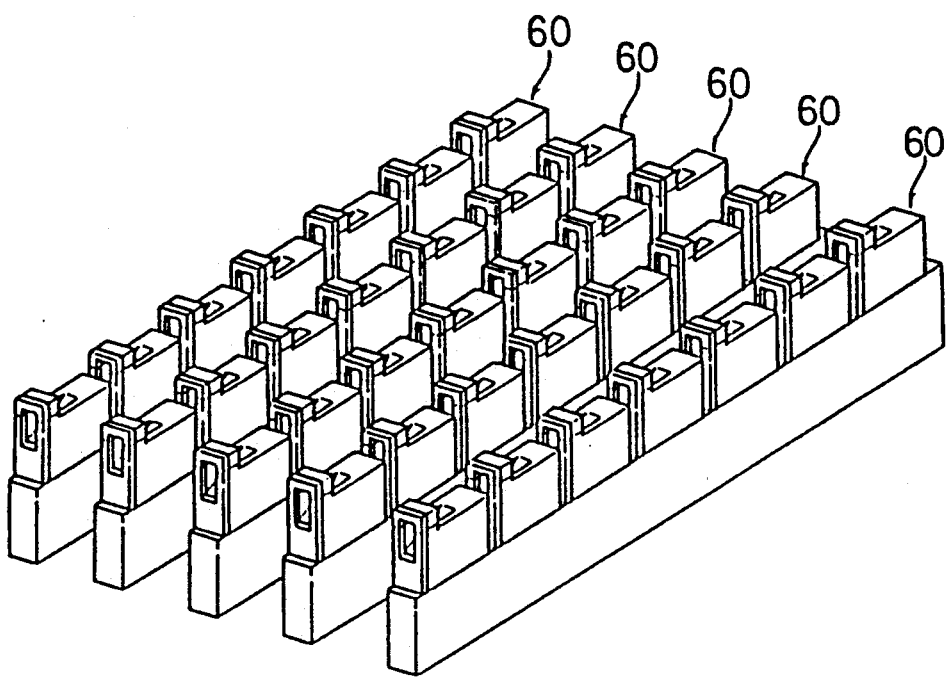
FIG. 10 is a perspective view showing magnetic head bars.

Then, as shown in FIG. 9, the magnetic head block 50 has its side of the C core plate 18' formed with grooves to form eventual C cores 18 with a head core thickness T. The magnetic head block 50 is then cut to obtain magnetic head bars 60 as shown in FIG. 10.

Figure 11:
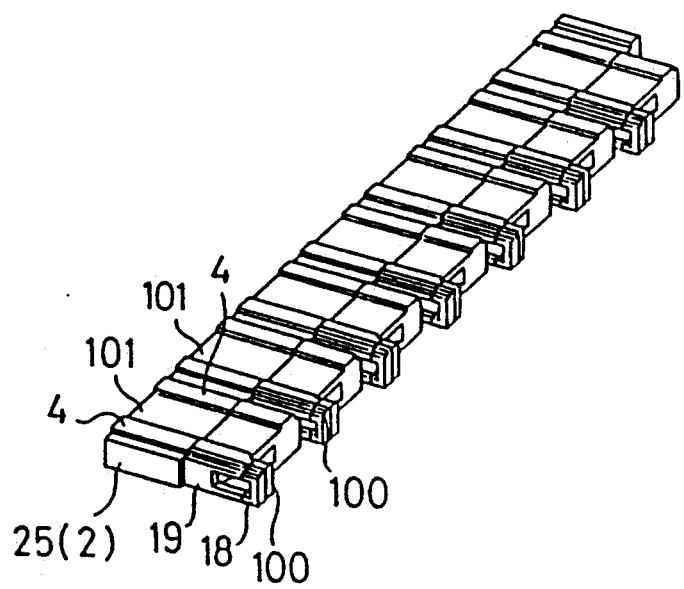
FIG. 11 is a perspective view showing a magnetic head bar after processing of an ABS.
Figure 12:
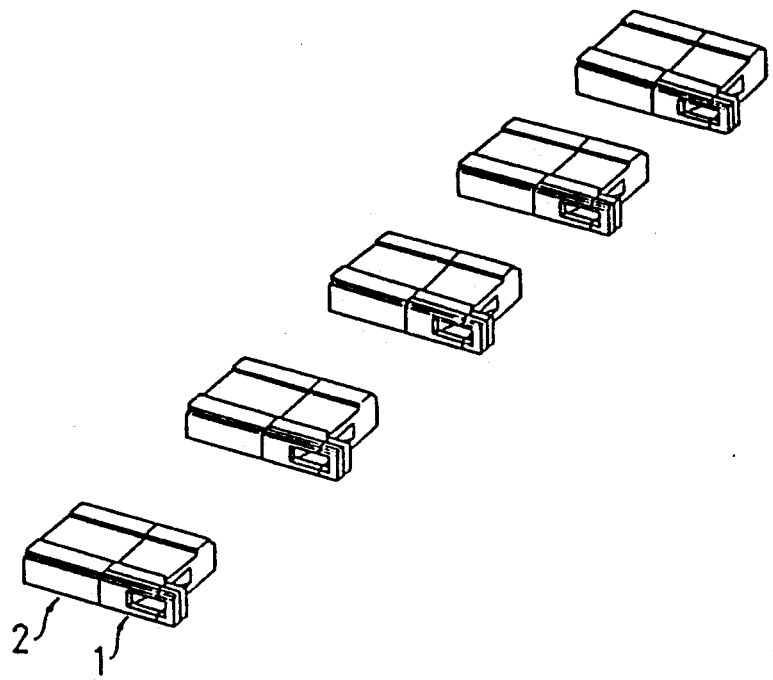
FIG. 12 is a perspective view showing flying magnetic heads separated from a magnetic head bar.

Each magnetic head bar 60 is then subjected to the processing of the ABS 4 such as the formation of the edge and center grooves 100 and 101, as shown in FIG. 11, and then cut apart to obtain eventual flying magnetic heads each comprising the head core 1 and the slider 2, as shown in FIG. 12.

Regarding the processing of the ABS, referring to FIG. 1, usually the edge grooves 100 each have a width of 50 to 100 μm and a depth from the ABS of 20 μm or above. The width $4_w$ of the ABS is usually 200 to 500 μm. Each separated flying magnetic head then has front and rear corners of its ABS 4 chamfered obliquely to form inclined surfaces 102 and 103 as its inlet and outlet end portions.

It has been found that with the above method of manufacture according to the invention the ABS 4 can be processed without any problem of the popping of the end portion of the head core 1, that is, the ABS can be processed very smoothly and readily to obtain smooth ABS.

Further, while in the above embodiment window grooves were shown to be inclined, it is possible to apply not-inclined window grooves.

Furthermore, while in the above embodiment the substrate 11 and slider 2 of the head core 11 were shown to be made of a ceramic or like non-magnetic material, it is possible to use ferrite or various other materials as well; for instance, ferrite may be used for both the substrate 11 and slider 2 of the head core 1. Further, while in the above description an Fe-Si-Al alloy magnetic material was used for the magnetic thin film layer 14 of the head core 1, it is possible to use an amorphous magnetic material or an iron nitride type alloy as well as noted before.

Further, while in the above embodiment the C core 18 of the head core 1 was provided in correspondence to a single ABS, it is possible to provide a C core in correspondence to each of the two ABSs 4 as well.

The invention will be described in further detail in connection with an example.

EXAMPLE 1

As the non-magnetic substrate 11 was used a non-magnetic ceramic substrate principally composed of CoO-NiO, and the magnetic thin film layer 14 was formed on the substrate 11 by depositing suitable numbers of Fe-Si-Al alloy films 12 and non-magnetic insulating films 13 alternately by the spattering process in the manner as described before in connection with FIG. 2. In this example, $SiO_2$ was used for the non-magnetic insulating films 13, and the thickness of the magnetic thin film layer 14 was set to 10 μm as the track width.

Subsequently, on the magnetic thin film layer 14 a laminate glass film 15 having a high melting point (with a softening point of 700° C.) was deposited to a thickness of 0.25 μm by spattering. The high-melting-point laminate glass film (with a softenig point of 700° C.) was also deposited to a thickness of 0.25 μm by spattering on the dummy plate 16 of the same material as the substrate 15. For the laminate glass 15 was used an $SiO_2$-$Al_2O_3$-$Na_2O$ type glass.

Then, eight substrates 11 each with the magnetic thin film lamination 14 were stacked together with the dummy plate 16 at the top such that the laminate glass 15 of the dummy plate 16 is face to face with the magnetic thin film layer 14 on the uppermost substrate 11, and the stack was pressed in a thermal press at 730° C. to obtain the magnetic thin film lamination 30.

The magnetic thin film lamination 30 was then sliced in the thickness direction of stacking to obtain the core plates 40. The opposite surfaces of each of these core plates 40 were then mirror surface finished.

One of the core plates 40 thus obtained then was formed on one side thereof with glass molding grooves extending perpendicular to the magnetic thin film layer 14, and apex glass moldings ma were fusion bonded along the glass molding grooves. Then, portions of the core plate, in which the apex glass moldings were provided, were formed with the wiring grooves 20. In this way, the C core plate 18' with the wiring grooves 20 and apex glass moldings ma formed at predetermined positions was obtained.

Meanwhile, another core plate 40 was sliced in a direction parallel to the magnetic thin film layer 14 to obtain the eventual I core bars 19. Each of these I core bars 19 was then formed with the inclined window grooves 22 having an inclination angle (θ) of 30° by spot facing.

In this example, the pitch $P_c$ of the wiring grooves 20 in the C core plate 18' and the pitch $P_I$ of the inclined grooves 22 of the I core bar 19 were set to 0.994 mm, the width $W_c$ and $W_I$ of the wiring grooves 20 and inclined grooves 22, respectively, were set to 0.35 mm, and the depths $h_c$ and $h_I$ of the wiring grooves 20 and inclined grooves 22, respectively, were set 0.27 and 0.57 mm, respectively.

After the formation of the wiring grooves and inclined grooves, the surface 18'a of the C core plate 18' with the wiring grooves 20 formed therein and the two surfaces of the I core bar 19 were polished. Then, on the polished surfaces, i.e., on the surface 18'a of the C core plate 18' with the wiring grooves 20 formed therein and the two surfaces of the I core bar 19, a bonding glass layer m having a high melting point (i.e., a softening point of 580° C.) was deposited by spattering. The thickness of the bonding glass layer m was set to 0.15 μm. For the bonding glass m was used an $SiO_2$-$Al_2O_3$-$Na_2O$ type glass.

Then, a predetermined number of the I core bars 19 were overlapped one by one over the C core plate 18' by effecting track alignment, i.e., by aligning the inclined grooves 22 of the I core bars 19 to the wiring grooves 20 of the C core plate 18' and also aligning the magnetic thin film layers 14, and then the dummy plate 25 is overlapped over the other surface of the I core bars 19. The overlapped I core bars 19, dummy plate 25 and C core plate 18' were then fusion bonded together in a jig at 600° C. and by application of a pressure, thus obtaining the magnetic head block 50.

Subsequently, the head blocks 50 each were grooved on the side of the C core plate 18' to form the C core 18 having a head core thickness (T) of 0.2 mm. Then, the magnetic head block 50 was sliced to obtain magnetic head bars 60.

Subsequently, the magnetic head bar 60 had its opposite surfaces ground and then formed with the edge grooves 100 and center groove 101, thus forming the ABS 4 with a width ($4_w$) of 0.34 mm. Then, it was cut at positions of 0.25 mm from the center of the magnetic thin film layer (track) 14, thus obtaining flying magnetic heads each comprising the head core 1 and slider 2 and having a head width and thickness of 2.24 and 0.61 mm, respectively.

Then, front and rear corners of the ABSs 4 were chamfered obliquely to form the inclined surfaces 102 and 103, then the ABSs 4 and inclined surfaces 102 and 103 were finish polished, and the winding is provided on the C core 18. In this example, a 60-turn winding could be attained without any problem.

As has been described in the foregoing, with the manufacturing method according to the invention a flying magnetic head having a smooth ABS can be readily and massively manufactured.

We claim:

1. A method of manufacturing a flying magnetic head comprising:
   (a) forming a magnetic thin film layer on each of a plurality of substrates;
   (b) bonding together said plurality of substrates each provided with said magnetic thin film layer with intervening high-melting-point laminate glass layers to form a magnetic thin film lamination;
   (c) slicing said magnetic thin film lamination in the direction of the thickness of said lamination to obtain a plurality of core plates;
   (d) grooving one of the principal surfaces of some of said core plates in a direction perpendicular to said magnetic thin film layer to form wiring grooves and apex glass molding grooves, thus obtaining C core plates formed with said wiring grooves and said apex glass molding grooves;
   (e) slicing other ones of said core plates in a direction parallel to said magnetic thin film layers to obtain I core bars;
   (f) forming each of said I core bars with a given number of window grooves;
   (g) depositing at least a high-melting-point bonding glass layer on the surface of each said C core plate formed with said wiring grooves and on the surface of each said I core bar formed with said window grooves;
   (h) overlapping the bonding glass layer formation surfaces of each of a given number of said I core bars and each said C core plate, overlapping a dummy plate with a high-melting-point bonding glass layer formed thereon and the other surface of said I core bars and bonding together said I core bars, said C core plate and said dummy plate with intervening bonding glass layers to form a magnetic head block;
   (i) grooving said magnetic head block on the side of said C core plate to form C cores having a predetermined head core thickness;
   (j) subsequently, slicing said magnetic head block in a direction parallel to said C cores to obtain a given number of magnetic head bars;
   (k) forming each said magnetic head bar with edge grooves and a center groove, thus forming ABSs and then slicing the resultant magnetic head bar to obtain a given number of flying magnetic heads;
   (l) obliquely chamfering front and rear portions of said ABSs of each said separated flying magnetic head to form inclined surfaces; and
   (m) providing a winding on the C core of each said flying magnetic head.

2. The method of manufacturing a flying magnetic head according to claim 1, wherein said high-melting-point laminate glass has a melting point of 650° to 800° C.

3. The method of manufacturing a flying magnetic head according to claim 1, wherein said high-melting-point bonding glass has a melting point ranging from 550° to 650° C.

4. The method of manufacturing a flying magnetic head according to claim 1, wherein said high-melting-point bonding glass layers have a thickness ranging from 0.1 to 0.7 μm.

5. The method of manufacturing a flying magnetic head according to claim 1, wherein said substrate and said dummy plate are formed of a non-magnetic material or ferrite.

6. The method of manufacturing a flying magnetic head according to claim 1, said magnetic thin film layer is formed of an Fe-Si-Al alloy, an amorphous magnetic material or an iron nitride type alloy.

7. The method of manufacturing a flying magnetic head according to claim 2, wherein said high-melting-point bonding glass has a melting point ranging from 550° to 650° C.

8. The method of manufacturing a flying magnetic head according to claim 2, wherein said high-melting-point bonding glass layers have a thickness ranging from 0.1 to 0.7 m.

9. The method of manufacturing a flying magnetic head according to claim 3, wherein said high-melting-point bonding glass layers have a thickness ranging from 0.1 to 0.7 m.

10. The method of manufacturing a flying magnetic head according to claim 2, wherein said substrate and said dummy plate are formed of a non-magnetic material or ferrite.

11. The method of manufacturing a flying magnetic head according to claim 3, wherein said substrate and said dummy plate are formed of a non-magnetic material or ferrite.

12. The method of manufacturing a flying magnetic head according to claim 4, wherein said substrate and said dummy plate are formed of a non-magnetic material or ferrite.

13. The method of manufacturing a flying magnetic head according to claim 2, said magnetic thin film layer is formed of an Fe-Si-Al alloy, an amorphous magnetic material or an iron nitride type alloy.

14. The method of manufacturing a flying magnetic head according to claim 3, said magnetic thin film layer is formed of an Fe-Si-Al alloy, an amorphous magnetic material or an iron nitride type alloy.

15. The method of manufacturing a flying magnetic head according to claim 4, said magnetic thin film layer is formed of an Fe-Si-Al alloy, an amorphous magnetic material or an iron nitride type alloy.

16. The method of manufacturing a flying magnetic head according to claim 5, said magnetic thin film layer is formed of an Fe-Si-Al alloy, an amorphous magnetic material or an iron nitride type alloy.

* * * * *